US011464211B2

(12) United States Patent
Hamaekers et al.

(10) Patent No.: US 11,464,211 B2
(45) Date of Patent: Oct. 11, 2022

(54) APPARATUS FOR FLY MANAGEMENT

(71) Applicant: BAYER ANIMAL HEALTH GMBH, Leverkusen (DE)

(72) Inventors: Veerle Hamaekers, Monheim (DE); Nazim Torun, Cologne (DE); Georg Berns, Dusseldorf (DE)

(73) Assignee: BAYER ANIMAL HEALTH GMBH ( * ) Notice: Subject to any disclaimer, the term of this patent is extended or adjusted under 35 U.S.C. 154(b) by 18 days.

(21) Appl. No.: 17/056,747

(22) PCT Filed: May 21, 2019

(86) PCT No.: PCT/EP2019/063092
§ 371 (c)(1),
(2) Date: Nov. 18, 2020

(87) PCT Pub. No.: WO2019/228861
PCT Pub. Date: Dec. 5, 2019

(65) Prior Publication Data
US 2021/0204521 A1 Jul. 8, 2021

(30) Foreign Application Priority Data

May 28, 2018 (EP) .................................... 18174587

(51) Int. Cl.
*A01K 29/00* (2006.01)
*A01N 29/00* (2006.01)
(Continued)

(52) U.S. Cl.
CPC ............ *A01K 29/005* (2013.01); *A01N 29/00* (2013.01); *G06T 7/0004* (2013.01); *G06T 7/11* (2017.01);
(Continued)

(58) Field of Classification Search
CPC ...... A01K 29/00; A01K 29/005; A01N 29/00; B64C 39/024; G06T 2207/20081;
(Continued)

(56) References Cited

U.S. PATENT DOCUMENTS 2,639,259 A * 5/1953 Wellman .............. C07D 233/56
514/517
3,265,568 A * 8/1966 Salvesen ................ A01N 25/04
424/45
(Continued)

FOREIGN PATENT DOCUMENTS

| CN | 205455287 U | 8/2016 |
| WO | 2004012146 A1 | 2/2004 |
| WO | 2017001538 A1 | 1/2017 |

OTHER PUBLICATIONS

International Searching Authority. International Search Report and Written Opinion for application PCT/EP2019/063092. dated Jul. 10, 2019. 10 pages.
(Continued)

*Primary Examiner* — Bobbak Safaipour
(74) *Attorney, Agent, or Firm* — Quarles & Brady LLP

(57) ABSTRACT

The present invention relates to an apparatus (10) for fly management. It is described to provide (310) a processing unit with at least one image of an agricultural environment, wherein the agricultural environment contains a plurality of bovine animals. The at least one image comprises image data of at least a part of at least one bovine animal of the plurality of bovine animals. The processing unit determines (320) a number of flies in the image data of the at least a part of at least one bovine animal. The processing unit determines (330) information relating to fly infestation of the plurality of bovine animals. The determination comprises utilisation of the determined number of flies. An output unit outputs (340) an indication relating to a treatment for fly
(Continued)

infestation of the plurality of bovine animals based on the determined information relating to fly infestation of the plurality of bovine animals.

35 Claims, 8 Drawing Sheets

(51) Int. Cl.
    *G06T 7/00*                (2017.01)
    *G06T 7/11*                (2017.01)

(52) U.S. Cl.
    CPC ............... *G06T 2207/20081* (2013.01); *G06T 2207/20084* (2013.01); *G06T 2207/30188* (2013.01); *G06T 2207/30242* (2013.01)

(58) Field of Classification Search
    CPC . G06T 2207/20084; G06T 2207/30188; G06T 2207/30242; G06T 7/0004; G06T 7/11; G06K 9/62; G06N 20/00; G06Q 30/0631; H04N 7/18
    See application file for complete search history.

(56) References Cited

U.S. PATENT DOCUMENTS

| | | | |
|---|---|---|---|
| 7,853,046 B2* | 12/2010 | Sharony | A01K 29/00 |
| | | | 382/110 |
| 2005/0025357 A1 | 2/2005 | Landwehr et al. | |
| 2006/0126903 A1 | 6/2006 | Sharony | |
| 2017/0032509 A1* | 2/2017 | Mannar | G06T 11/206 |
| 2017/0071164 A1* | 3/2017 | Zucker | A01K 67/033 |
| 2017/0374323 A1* | 12/2017 | Gornik | G06T 7/0004 |
| 2018/0000575 A1 | 1/2018 | Fobi | |
| 2020/0038352 A1* | 2/2020 | Yoon | C07D 311/22 |

OTHER PUBLICATIONS

National Intellectual Property Administration, P.R. China, First Office Action and Search Report, Application No. 201980035823.9, dated Feb. 15, 2022, 30 pages.

National Institute of Industrial Property—INAPI, Exped Report and Search Report, Application No. 202003054, dated Mar. 23, 2022, 15 pages.

* cited by examiner

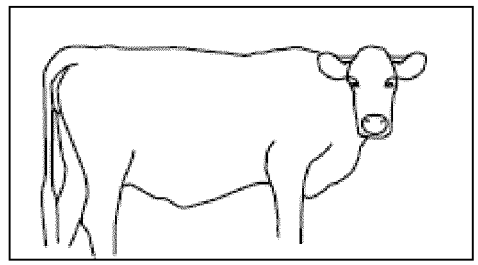
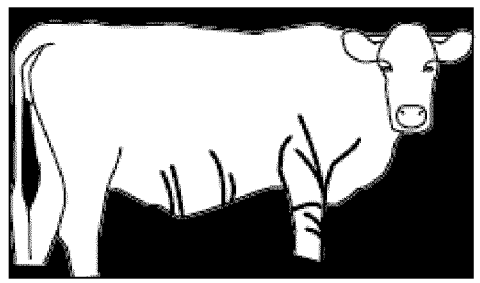
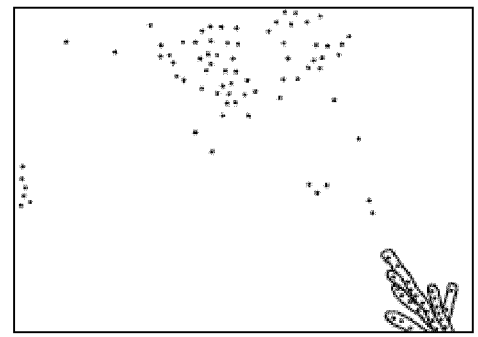
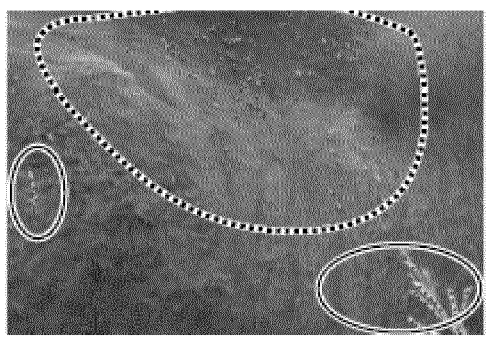
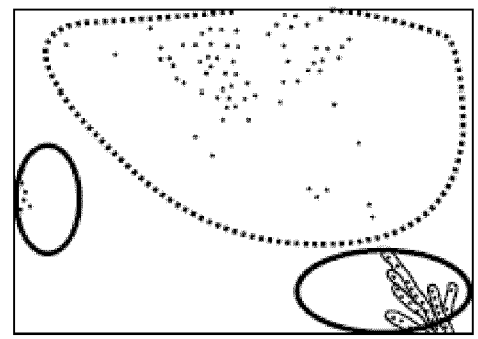
Fig. 9a          Fig. 9b

APPARATUS FOR FLY MANAGEMENT

CROSS-REFERENCE TO RELATED APPLICATIONS

This application is a U.S. National Stage of PCT Application No. PCT/EP2019/063092 filed on May 21, 2019 which claims the benefit of priority to European Application No. 18174587.8 filed on May 28, 2018, which are herein incorporated by reference in their entirety.

FIELD OF THE INVENTION

The present invention relates to an apparatus for fly management, to a device for fly management, to a system for fly management, to a method for fly management, as well as to a computer program element and a computer readable medium.

BACKGROUND OF THE INVENTION

The general background of this invention is the control of flies for the cattle industry, in both beef cattle and dairy cow environments. Certain flies such as horn flies, stable flies, face flies and horse flies take multiple blood meals from beef cattle and dairy cows, hereafter referred to as cattle or bovine animals, each day. Infested cattle react by licking affected areas, switching their tails and twitching their flanks. In addition to the high number of painful bites that occur on a daily basis and associated stress, lesions resulting from such bites can lead to secondary infections and to cosmetic defects to the animals hide. The growth rates of infested cattle is decreased significantly with respect to non-infested cattle, lactation rates are also much lower and lower quality hides impact the leather industry. It is estimated that the yearly impact of fly infestation for the global cattle industry is measured in the billions of dollars. However, farmers do not have a simple way to determine when to treat their cattle, and it can be difficult even for experienced farmers to determine if a whole field full of cattle should be treated on the basis of flies on and around one or several cattle in a field.

SUMMARY OF THE INVENTION

It would be advantageous to have improved means to determine if cattle should be treated for fly infestation.

The object of the present invention is solved with the subject matter of the independent claims, wherein further embodiments are incorporated in the dependent claims. It should be noted that the following described aspects and examples of the invention apply also for the apparatus for fly management, the device for fly management, the system for fly management, the method for fly management, and for the computer program element and the computer readable medium.

According to a first aspect, there is provided an apparatus for fly management, comprising:

an input unit;
a processing unit; and
an output unit.

The input unit is configured to provide the processing unit with at least one image of an agricultural environment, wherein the agricultural environment contains a plurality of bovine animals. The at least one image comprises image data of at least a part of at least one bovine animal of the plurality of bovine animals. The processing unit is configured to determine a number of flies in the image data of the at least a part of at least one bovine animal. The processing unit is configured to determine information relating to fly infestation of the plurality of bovine animals, the determination comprising utilisation of the determined number of flies. The output unit is configured to output an indication relating to a treatment for fly infestation of the plurality of bovine animals based on the determined information relating to fly infestation of the plurality of bovine animals.

In other words, imagery of cattle or indeed one cow/steer is analysed to detect flies, and this is used to provide a farmer with objective information as to whether all the cattle in an area should be treated for fly infestation or not. It can be difficult for a farmer to determine if their cattle should be treated for fly infestation, and this provides a simple manner to automatically raise the alarm to the farmer that action is required, or conversely that no action at that time is required. Thus, a fly diagnostic technology is provided that provides for better cattle management decisions with respect to fly infestation.

In an example, the image data of at least a part of at least one bovine animal comprises image data other than image data of a bovine animal that is contiguous to the bovine animal.

In this manner, image data around one or more cattle is being analysed in addition to image data of that one or more cattle, and in this way flies that are on the one or more cattle and flies that are in flight around the one or more cattle can be counted.

In an example, the processing unit is configured to identify at least one particular type of fly in the image data of the at least a part of at least one bovine animal. The determined number of flies in the image data of the at least a part of at least one bovine animal can then be a number of flies in the image data of the at least a part of at least one bovine animal that are the at least one particular type of fly.

Thus, the decision to apply a fly treatment can take into account the types of flies in evidence. In this manner, a higher detrimental financial impact associated with certain flies with respect to other flies can be addressed by identifying those flies and applying a treatment, when that treatment would not be applied if a less aggressive or detrimental fly was present. Also, the specific fly treatment to be applied can account for the type or types of flies in evidence.

In an example, determination of the number of flies in the image comprises implementation of an image processing algorithm to analyse the image data of the at least a part of at least one bovine animal.

In an example, the image processing algorithm comprises a machine learning algorithm.

In an example, the machine learning algorithm is a neural network.

In an example, the machine learning algorithm is a trained machine learning algorithm. The machine learning training can comprise utilization of ground truth data and associated imagery.

In an example, subsequent training of the machine learning algorithm comprises utilization of the image data of the at least a part of at least one bovine animal.

In this manner, the machine learning algorithm can continue to improve.

In an example, the subsequent training comprises utilization of the determined number of flies.

In an example, the input unit is configured to receive from a user a validation of the indication relating to a treatment for fly infestation of the plurality of bovine animals. The subsequent training can comprise utilization of the validation.

In this manner, a farmer or user could agree or disagree or not totally agree with the indication provided. This enables the effect of false positives to be mitigated, where for example mud droplets on cattle that leads to the image processing algorithm to count too many flies, could lead to a too higher infestation level and/or number of flies (such as an average number) being presented to the farmer. The farmer using their experience could query this result, and either that image data could be discarded from the training set or used with to adjust the weights within the neural network layers in order that such mud dots could better be differentiated from flies. Thus, a more and more robust diagnostic tool is developed with time.

In an example, a pixel in the image data of the at least a part of at least one bovine animal projected back to the at least part of the at least one bovine animal is less than or equal to 2 mm.

In other words, flies are imaged at an appropriate resolution level to be able to differentiate flies from other objects and even if at a high enough resolution to differentiate one fly from another. Thus, for example having 5 or more pixels covering a length and/or width of a fly can enable efficient detection/identification.

In an example, the indication relating to the treatment for fly infestation of the plurality of bovine animals comprises an indication of a defined infestation level of a plurality of possible infestation levels.

In an example, the indication relating to the treatment for fly infestation of the plurality of bovine animals comprises a message that the plurality of bovine animals need to be treated for fly infestation.

In an example, the processing unit is configured to identify at least one chemical product useable for treatment for fly infestation. The indication relating to the treatment for fly infestation of the plurality of bovine animals can comprise a message relating to the at least one chemical product useable for treatment for fly infestation.

In an example, the input unit is configured to enable a user to input information relating to at least one previous chemical product used for treatment of fly infestation in the agricultural environment. Identification of the at least one chemical product useable for treatment for fly infestation can comprise utilisation of the information relating to at least one previous chemical product used for treatment of fly infestation in the agricultural environment.

In this manner, a farmer is provided with information relating to the rotation of active ingredients and/or information relating to what has or has not previously worked, enabling informed decisions on what treatment is best, and thereby also mitigating resistance build-up to active ingredients.

In an example, the indication relating to the treatment for fly infestation of the plurality of bovine animals comprises a message that the plurality of bovine animals need not be treated for fly infestation.

In an example, determination of the information relating to fly infestation of the plurality of bovine animals comprises utilization of a threshold number of flies.

Thus, when cattle are infested with flies that are above a certain threshold number that has been determined to have economic consequences, a farmer can be informed that action should be taken. And similarly, when that threshold has not been reached the farmer can be informed that no action need be taken.

In an example, the at least one image comprises a plurality of images. The at least one part of the at least one bovine animal can comprise a plurality of parts of the at least one bovine animal. Each image of the plurality of images can be associated with a different part of the plurality of parts. The determined number of flies in the image data of the at least a part of at least one bovine animal can comprise a number of flies in each image of the plurality of images.

In an example, the determination of information relating to fly infestation of the plurality of bovine animals comprises a statistical analysis of the number of flies in each image of the plurality of images.

In this manner, a better appreciation of potential fly infestation can be determined, through for example a deselection of outlier cases, either where some images have a statistically significant much higher or much lower number than the average and are not then taken into consideration. Also, a returned average value can have an associated error margin, determined from the standard deviation divided by the square root of the number of images analysed and this can be used to determine a confidence level. For example, if an indication is over a threshold level but has a large error margin due to large fluctuations of fly numbers in the imagery, this could be indicated to the farmer who can then make an advised decision as to how to proceed. Similarly, if the numbers of flies per image are within a consistent range, leading to a returned indication with a low margin of error this can be used to enable a farmer to initiate treatment, even when a threshold has just been reached.

In an example, the at least one bovine animal comprises at least two bovine animals. A first part of the plurality of parts can be associated with a first bovine animal of the at least one bovine animal and a second part of the plurality of parts can be associated with a second bovine animal of the at least one bovine animal.

Thus, imagery that could be of just one cow/cattle/steer now includes a number of cows/cattle/steers in order to better determine if there is a fly problem with a herd of cattle.

In an example, each part of the plurality of parts is associated with a different bovine animal.

In an example, at least one first image of the plurality of images was acquired on a different day to at least one second image of the plurality of images.

In this manner, a farmer can obtain an understanding of whether a problem is waxing or waning, and if necessary take pre-emptive action of a developing problem before it become economically detrimental, but that if left untreated would have led to such detrimental effects.

In an example, the processing unit is configured to implement a segmentation algorithm to analyse the at least one image to determine the image data of the at least a part of at least one bovine animal.

In an example, the segmentation algorithm is configured to determine at least one area of the at least one image that has image data of an object other than one or more flies and wherein that object is other than the at least one bovine. Determination of the image data of the at least a part of at least one bovine animal can comprise a deselection of the at least one area from the at least one image.

In this manner, image data such as muddy patches on a cow or a branding mark on the cow or image data of plants in front of the cow can be identified, and not be included in the imagery that is then analysed to determine a number of flies in evidence.

This improves the speed and accuracy of such a determination, and helps to mitigate false positives.

In an example, the processing unit is configured to detect the at least one bovine animal, the detection comprising analysis of the at least one image.

In an example, analysis of the at least one image to detect the at least one bovine animal comprises utilization of an object detection algorithm.

According to a second aspect, there is provided a device for fly management, comprising:
- a camera;
- an apparatus for fly management according to the first aspect; and
- a housing.

The camera and apparatus are housed within the housing. The camera is configured to acquire the at least one image of the agricultural environment. In this manner, a farmer can walk around a field and acquire imagery of and around the cattle, and be provided with an indication as to whether to treat the cattle for fly infestation or not.

In an example, the input unit is configured to provide the processing unit with at least one start image. The at least one start image comprises image data of a number of bovine animals. The number of bovine animals comprises the at least one bovine animal. The processing unit is configured to select the at least one bovine animal, the selection comprising analysis of the at least one start image.

In this manner, the farmer can be informed as to where in a herd of cows or cattle they could acquire imagery. Thus, the farmer can be informed to acquire imagery of cows/cattle spaced throughout a herd in order to obtain a better statistical appreciation of the fly situation, rather than acquiring imagery from the first few cows encountered that can result in an artificially low or high average number of flies per cow in the field.

In an example, the output unit is configured to present to a user of the device at least one indication relating to the selected at least one bovine animal.

In an example, the output unit comprises a visual display unit. The visual display unit is configured to display the at least one start image with the at least one indication relating to the selected at least one bovine highlighted on the at least one start image.

This helps the farmer determine what cows/cattle to image or photograph.

In an example, the input unit is configured to enable a user to input a command instruction to apply a treatment for fly infestation to the plurality of bovine animals in response to the output of the indication relating to a treatment for fly infestation of the plurality of bovine animals on the output unit. The device is configured to transmit the command instruction to at least one fly infestation treatment application unit.

Thus, the farmer is provided with an indication as to the fly problem, but they then have control over, and a simple means of initiating, the automated treatment of the cows/cattle in the field.

According to a third aspect, there is provided a system for fly management, comprising:
- a camera;
- a first transceiver;
- a processing unit;
- a second transceiver; and
- a housing.

The camera, and first transceiver are housed in the housing. The processing unit and second transceiver are not housed in the housing. The camera is configured to acquire at least one image of an agricultural environment. The agricultural environment contains a plurality of bovine animals. The at least one image comprises image data of at least a part of at least one bovine animal of the plurality of bovine animals. The first transceiver is configured to transmit the at least one image and the second transceiver is configured to receive the at least one image. The second transceiver is configured to provide the processing unit with the at least one image. The processing unit is configured to determine a number of flies in the image data of the at least a part of at least one bovine animal. The processing unit is configured to determine information relating to fly infestation of the plurality of bovine animals, the determination comprising utilisation of the determined number of flies.

In an example, the system comprises at least one fly infestation treatment application unit. The at least one fly infestation treatment application unit is configured to apply a treatment for fly infestation to the plurality of bovine animals on the basis of the determined information relating to fly infestation of the plurality of bovine animals.

In an example, the system comprises an output unit housed within the housing. The second transceiver is configured to transmit the information relating to fly infestation of the plurality of bovine animals and the first transceiver is configured to receive the information relating to fly infestation of the plurality of bovine animals. The output unit is configured to output an indication relating to a treatment for fly infestation of the plurality of bovine animals based on the determined information relating to fly infestation of the plurality of bovine animals.

In an example, the system comprises an input unit housed within the housing. The input unit is configured to enable a user to input a command instruction to apply a treatment for fly infestation to the plurality of bovine animals in response to the output of the indication relating to a treatment for fly infestation of the plurality of bovine animals on the output unit. The first transceiver is configured to send the command instruction to the at least one fly infestation treatment application unit.

According to a fourth aspect, there is provided a method for fly management, comprising:
a) providing a processing unit with at least one image of an agricultural environment, wherein the agricultural environment contains a plurality of bovine animals; and wherein the at least one image comprises image data of at least a part of at least one bovine animal of the plurality of bovine animals;
b) determining by the processing unit a number of flies in the image data of the at least a part of at least one bovine animal; and
c) determining by the processing unit information relating to fly infestation of the plurality of bovine animals, the determination comprising utilisation of the determined number of flies.

According to another aspect, there is provided a computer program element for controlling an apparatus according as described above and/or a device as described above and/or a system as described above, which when executed by a processor is configured to carry out the method as described above.

According to another aspect, there is provided a computer readable medium having stored the computer program element as described above.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings, and Table 1:

FIG. 9 shows imagery and processed imagery in an example of steps involved in fly management and representative schematics of that imagery.

DETAILED DESCRIPTION OF EMBODIMENTS

Figure 1:
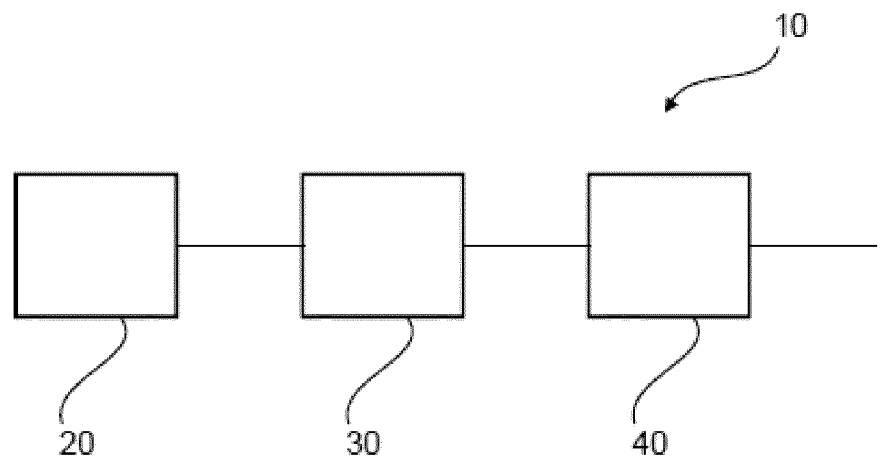
FIG. 1 shows a schematic set up of an example of an apparatus for fly management.

FIG. 1 shows an example of an apparatus 10 for fly management. The apparatus 10 comprises an input unit 20, a processing unit 30, and an output unit 40. The input unit 20 is configured to provide the processing unit 30 with at least one image of an agricultural environment. The agricultural environment contains a plurality of bovine animals. Bovine animals here refers to cows, cattle, steers, bison, buffalo. The at least one image comprises image data of at least a part of at least one bovine animal of the plurality of bovine animals. The processing unit 30 is configured to determine a number of flies in the image data of the at least a part of at least one bovine animal. The processing unit 30 is configured also to determine information relating to fly infestation of the plurality of bovine animals, the determination comprising utilisation of the determined number of flies. The output unit 40 is configured to output an indication relating to a treatment for fly infestation of the plurality of bovine animals based on the determined information relating to fly infestation of the plurality of bovine animals.

In an example, the at least one image was acquired by a camera of a hand-held device.

In an example, the at least one image was acquired by a camera of a smart phone.

In an example, the at least one image was acquired by a camera with a zoom lens capability.

In an example, the at least one image was acquired by a camera fixedly mounted in the agricultural environment.

In an example, the at least one image was acquired by a camera of an unmanned aerial vehicle (UAV).

According to an example, the image data of at least a part of at least one bovine animal comprises image data other than image data of a bovine animal that is contiguous to the bovine animal.

According to an example, the processing unit is configured to identify at least one particular type of fly in the image data of the at least a part of at least one bovine animal. The determined number of flies in the image data of the at least a part of at least one bovine animal can then be a number of flies in the image data of the at least a part of at least one bovine animal that are the at least one particular type of fly.

According to an example, determination of the number of flies in the image comprises implementation of an image processing algorithm to analyse the image data of the at least a part of at least one bovine animal.

According to an example, the image processing algorithm comprises a machine learning algorithm.

In an example, the machine learning algorithm comprises a decision tree algorithm.

A machine learning model is used to find correlations between imagery of and around cattle with ground truth numbers of flies, and between imagery of and around cattle with ground truth information relating to the types of flies present, and imagery of and around cattle with ground truth information relating to features such as mud, plants, that are in the imagery. In this manner a machine learning approach trained in this way can be used to process imagery and determine the number of flies present and the types of flies, taking into account other features in the imagery such as plants and mud patches.

TensorFlow may be used for this purpose. TensorFlow is an open-source software library for dataflow programming across a range of tasks. It is a symbolic math library, and is also used for machine learning applications such as neural networks. TensorFlow was developed by the Google Brain team for internal Google use. It was released under the Apache 2.0 open source license on Nov. 9, 2015.

According to an example, the machine learning algorithm is a neural network.

In an example, the neural network in a deep learning neural network comprises at least one hidden layer.

According to an example, the machine learning algorithm is a trained machine learning algorithm, wherein the machine learning training comprises utilization of ground truth data and associated imagery.

In an example, the machine learning algorithm has been taught on the basis of a plurality of images. In an example, the machine learning algorithm has been taught on the basis of a plurality of images containing imagery of at least one type of fly, and that contains imagery having no flies. In an example, the machine learning algorithm is provided with the number of flies, including the number zero, as a ground truth number for associated imagery. In an example, imagery of flies on and around cattle is provided as well as imagery of cattle hide having no flies and areas next to cattle having no flies. In an example, the imagery has imagery of objects other than flies, such as spots of mud, plants etc. In an example, the locations as well as numbers of flies is provided as ground truth information along with the associated imagery. In an example, the identification of different types of flies in imagery is provided as ground truth information. In an example, all imagery is provided having been taken over a range of daylight and weather conditions.

According to an example, subsequent training of the machine learning algorithm comprises utilization of the image data of the at least a part of at least one bovine animal.

According to an example, the subsequent training comprises utilization of the determined number of flies.

According to an example, the input unit is configured to receive from a user a validation of the indication relating to a treatment for fly infestation of the plurality of bovine animals, and wherein the subsequent training comprises utilization of the validation.

According to an example, a pixel in the image data of the at least a part of at least one bovine animal projected back to the at least part of the at least one bovine animal is less than or equal to 2 mm.

In an example, the projection of the pixel at the object plane is less than or equal to 1.5 mm.

In an example, the projection of the pixel at the object plane is less than or equal to 1.0 mm.

In an example, the projection of the pixel at the object plane is less than or equal to 0.75 mm.

In an example, the projection of the pixel at the object plane is less than or equal to 0.5 mm.

In an example, the projection of the pixel at the object plane is less than or equal to 0.25 mm.

According to an example, the indication relating to the treatment for fly infestation of the plurality of bovine animals comprises an indication of a defined infestation level of a plurality of possible infestation levels.

According to an example, the indication relating to the treatment for fly infestation of the plurality of bovine animals comprises a message that the plurality of bovine animals need to be treated for fly infestation.

According to an example, the processing unit is configured to identify at least one chemical product useable for treatment for fly infestation. The indication relating to the treatment for fly infestation of the plurality of bovine animals can then comprise a message relating to the at least one chemical product useable for treatment for fly infestation.

According to an example, the input unit is configured to enable a user to input information relating to at least one previous chemical product used for treatment of fly infestation in the agricultural environment. Identification of the at least one chemical product that could now be used for treatment for fly infestation comprises utilisation of the information relating to at least one previous chemical product used for treatment of fly infestation in the agricultural environment.

According to an example, the indication relating to the treatment for fly infestation of the plurality of bovine animals comprises a message that the plurality of bovine animals need not be treated for fly infestation.

According to an example, determination of the information relating to fly infestation of the plurality of bovine animals comprises utilization of a threshold number of flies.

According to an example, the at least one image comprises a plurality of images, wherein the at least one part of the at least one bovine animal comprises a plurality of parts of the at least one bovine animal. Each image of the plurality of images is associated with a different part of the plurality of parts. The determined number of flies in the image data of the at least a part of at least one bovine animal can then comprise a number of flies in each image of the plurality of images.

According to an example, the determination of information relating to fly infestation of the plurality of bovine animals comprises a statistical analysis of the number of flies in each image of the plurality of images.

According to an example, the at least one bovine animal comprises at least two bovine animals. A first part of the plurality of parts can then be associated with a first bovine animal of the at least one bovine animal and a second part of the plurality of parts can be associated with a second bovine animal of the at least one bovine animal.

According to an example, each part of the plurality of parts is associated with a different bovine animal.

In an example, images of two bovine animals are acquired and analysed.

In an example, images of four bovine animals are acquired and analysed.

In an example, images of eight bovine animals are acquired and analysed.

In an example, images of more than eight bovine animals are acquired and analysed.

According to an example, at least one first image of the plurality of images was acquired on a different day to at least one second image of the plurality of images.

In an example, each image of the plurality of images was acquired on a different day.

According to an example, the processing unit is configured to implement a segmentation algorithm to analyse the at least one image to determine the image data of the at least a part of at least one bovine animal.

According to an example, the segmentation algorithm is configured to determine at least one area of the at least one image that has image data of an object other than one or more flies and wherein that object is other than the at least one bovine. Determination of the image data of the at least a part of at least one bovine animal can then comprises a deselection of the at least one area from the at least one image.

In an example, the segmentation algorithm is trained on the basis of imagery having flies and having objects other than flies, such as mud patches, and plants imaged.

In an example, the segmentation algorithm is comprised with the image processing algorithm such as the neural network based image processing algorithm.

According to an example, the processing unit is configured to detect the at least one bovine animal, the detection comprising analysis of the at least one image.

According to an example, analysis of the at least one image to detect the at least one bovine animal comprises utilization of an object detection algorithm.

Figure 2:
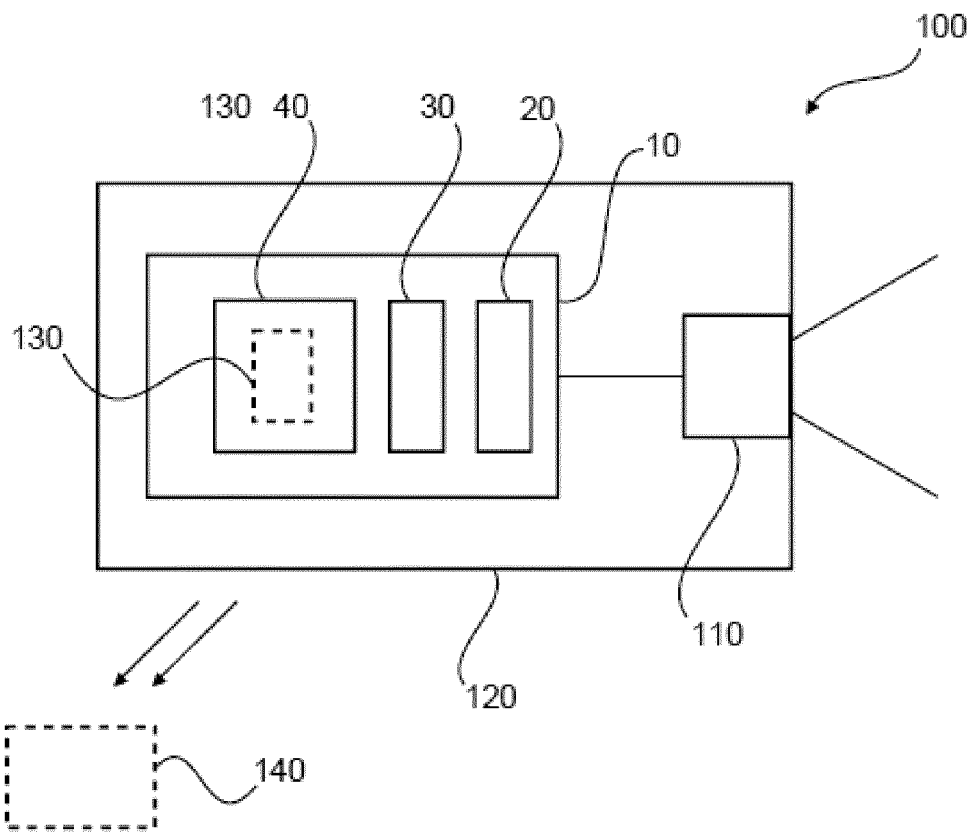
FIG. 2 shows a schematic set up of an example of a device for fly management.

FIG. 2 shows an example of a device 100 for fly management. The device 100 comprises a camera 110, an apparatus 10 for fly management as described above with reference to FIG. 1, and a housing 120. The camera 110 and apparatus 10 are housed within the housing 120. The camera 110 is configured to acquire the at least one image of the agricultural environment.

In an example, the device is a hand-held device.

In an example, the device is a smart phone.

In an example, the device has a camera with a zoom lens capability.

In an example, the device is fixedly mounted in the agricultural environment.

In an example, the device is an unmanned aerial vehicle (UAV). In an example, the UAV is configured to carry out a fly infestation treatment of one or more bovine animals. In an example, the fly infestation treatment comprises application of a chemical product to the one or more bovine animals.

According to an example of the device, the input unit 20 of the apparatus 10 is configured to provide the processing unit 30 of the apparatus with at least one start image. The at least one start image comprises image data of a number of bovine animals. The number of bovine animals comprises the at least one bovine animal. The processing unit is configured to select the at least one bovine animal, the selection comprising analysis of the at least one start image.

According to an example of the device 100, the output unit 40 of the apparatus 10 is configured to present to a user of the device at least one indication relating to the selected at least one bovine animal.

According to an example, the output unit comprises a visual display unit 130. The visual display unit is configured to display the at least one start image with the at least one indication relating to the selected at least one bovine highlighted on the at least one start image.

According to an example, the input unit is configured to enable a user to input a command instruction to apply a treatment for fly infestation to the plurality of bovine animals in response to the output of the indication relating to a treatment for fly infestation of the plurality of bovine animals on the output unit. The device is configured to transmit the command instruction to at least one fly infestation treatment application unit 140.

In an example, the at least one fly infestation treatment application unit comprises one or more unmanned aerial vehicles.

Figure 3:
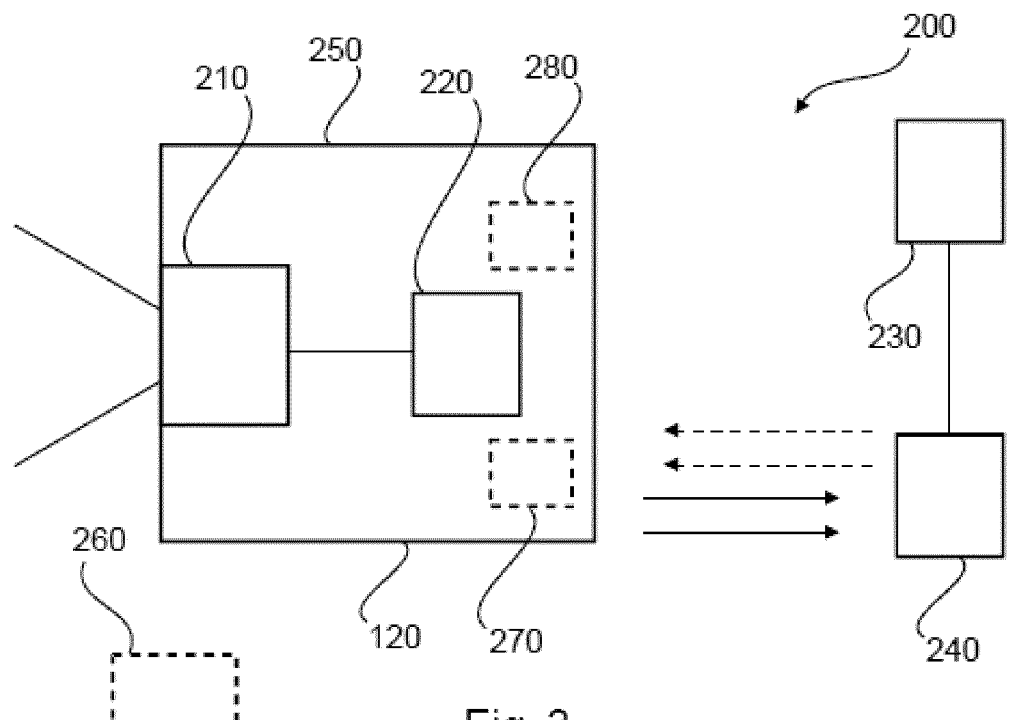
FIG. 3 shows a schematic set up of an example of a system for fly management.
Figure 4:
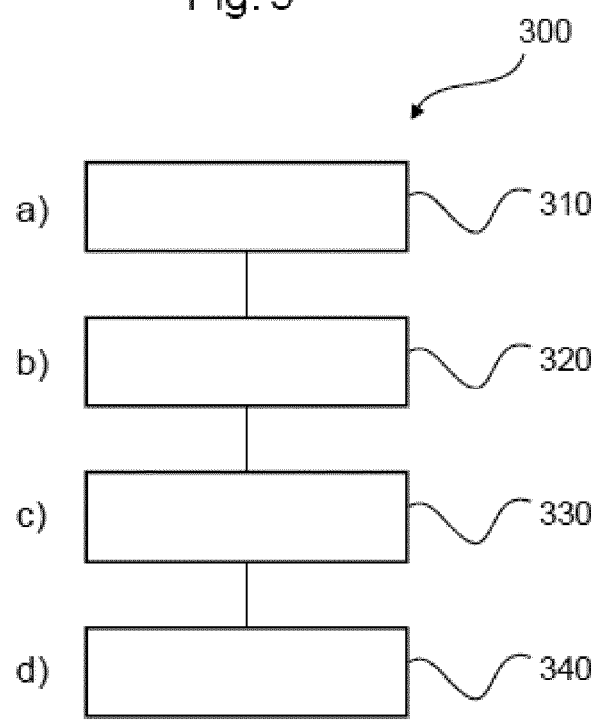
FIG. 4 shows a method for fly management.

FIG. 3 shows an example of a system 200 for fly management. The system 200 comprises a camera 210, a first transceiver 220, a processing unit 230, a second transceiver 240, and a housing 250. The camera 210, and first transceiver 220 are housed in the housing 250. The processing unit 230 and second transceiver 240 are not housed in the housing 250. The camera 210 is configured to acquire at least one image of an agricultural environment. The agricultural environment contains a plurality of bovine animals. The at least one image comprises image data of at least a part of at least one bovine animal of the plurality of bovine animals. The first transceiver 220 is configured to transmit the at least one image and the second transceiver 240 is configured to receive the at least one image. The second transceiver 240 is configured to provide the processing unit 230 with the at least one image. The processing unit 230 is configured to determine a number of flies in the image data of the at least a part of at least one bovine animal. The processing unit 230 is configured also to determine information relating to fly infestation of the plurality of bovine animals, the determination comprising utilisation of the determined number of flies.

According to an example, the system comprises at least one fly infestation treatment application unit 260. The at least one fly infestation treatment application unit is configured to apply a treatment for fly infestation to the plurality of bovine animals on the basis of the determined information relating to fly infestation of the plurality of bovine animals.

In an example, the second transceiver is configured to send a command instruction to the at least one fly infestation treatment unit to apply a treatment for fly infestation to the plurality of bovine animals.

According to an example, the system comprises an output unit 270 housed within the housing. The second transceiver is configured to transmit the information relating to fly infestation of the plurality of bovine animals and the first transceiver is configured to receive the information relating to fly infestation of the plurality of bovine animals. The output unit is configured to output an indication relating to a treatment for fly infestation of the plurality of bovine animals based on the determined information relating to fly infestation of the plurality of bovine animals.

According to an example, the system comprises an input unit 280 housed within the housing. The input unit is configured to enable a user to input a command instruction to apply a treatment for fly infestation to the plurality of bovine animals in response to the output of the indication relating to a treatment for fly infestation of the plurality of bovine animals on the output unit. The first transceiver is configured to send the command instruction to the at least one fly infestation treatment application unit.

In an example, the at least one fly infestation treatment application unit comprises one or more unmanned aerial vehicle.

In an example, the at least one image was acquired by a camera of a hand-held device.

In an example, the at least one image was acquired by a camera of a smart phone.

In an example, the at least one image was acquired by a camera with a zoom lens capability.

In an example, the at least one image was acquired by a camera fixedly mounted in the agricultural environment.

In an example, the at least one image was acquired by a camera of an unmanned aerial vehicle (UAV).

In an example, the image data of at least a part of at least one bovine animal comprises image data other than image data of a bovine animal that is contiguous to the bovine animal.

In an example, the processing unit is configured to identify at least one particular type of fly in the image data of the at least a part of at least one bovine animal.

The determined number of flies in the image data of the at least a part of at least one bovine animal can then be a number of flies in the image data of the at least a part of at least one bovine animal that are the at least one particular type of fly.

In an example, determination of the number of flies in the image comprises implementation of an image processing algorithm to analyse the image data of the at least a part of at least one bovine animal.

In an example, the image processing algorithm comprises a machine learning algorithm.

In an example, the machine learning algorithm is a neural network.

In an example, the neural network in a deep learning neural network comprises at least one hidden layer.

In an example, the machine learning algorithm is a trained machine learning algorithm, wherein the machine learning training comprises utilization of ground truth data and associated imagery.

In an example, subsequent training of the machine learning algorithm comprises utilization of the image data of the at least a part of at least one bovine animal.

In an example, the subsequent training comprises utilization of the determined number of flies.

In an example, the input unit is configured to receive from a user a validation of the indication relating to a treatment for fly infestation of the plurality of bovine animals, and wherein the subsequent training comprises utilization of the validation.

In an example, a pixel in the image data of the at least a part of at least one bovine animal projected back to the at least part of the at least one bovine animal is less than or equal to 2 mm.

In an example, the projection of the pixel at the object plane is less than or equal to 1.5 mm.

In an example, the projection of the pixel at the object plane is less than or equal to 1.0 mm.

In an example, the projection of the pixel at the object plane is less than or equal to 0.75 mm.

In an example, the projection of the pixel at the object plane is less than or equal to 0.5 mm.

In an example, the projection of the pixel at the object plane is less than or equal to 0.25 mm.

In an example, the indication relating to the treatment for fly infestation of the plurality of bovine animals comprises an indication of a defined infestation level of a plurality of possible infestation levels.

In an example, the indication relating to the treatment for fly infestation of the plurality of bovine animals comprises a message that the plurality of bovine animals need to be treated for fly infestation.

In an example, the processing unit is configured to identify at least one chemical product useable for treatment for fly infestation. The indication relating to the treatment for fly infestation of the plurality of bovine animals can then comprise a message relating to the at least one chemical product useable for treatment for fly infestation.

In an example, the input unit is configured to enable a user to input information relating to at least one previous chemical product used for treatment of fly infestation in the agricultural environment. Identification of the at least one chemical product useable for treatment for fly infestation can then comprise utilisation of the information relating to at least one previous chemical product used for treatment of fly infestation in the agricultural environment.

In an example, the indication relating to the treatment for fly infestation of the plurality of bovine animals comprises a message that the plurality of bovine animals need not be treated for fly infestation.

In an example, determination of the information relating to fly infestation of the plurality of bovine animals comprises utilization of a threshold number of flies.

In an example, the at least one image comprises a plurality of images, wherein the at least one part of the at least one bovine animal comprises a plurality of parts of the at least one bovine animal. Each image of the plurality of images can be associated with a different part of the plurality of parts. The determined number of flies in the image data of the at least a part of at least one bovine animal can then comprises a number of flies in each image of the plurality of images.

In an example, determination of information relating to fly infestation of the plurality of bovine animals comprises a statistical analysis of the number of flies in each image of the plurality of images.

In an example, the at least one bovine animal comprises at least two bovine animals. A first part of the plurality of parts can be associated with a first bovine of the at least one bovine and a second part of the plurality of parts can be associated with a second bovine of the at least one bovine.

In an example, each part of the plurality of parts is associated with a different bovine animal.

In an example, at least one first image of the plurality of images was acquired on a different day to at least one second image of the plurality of images.

In an example, the processing unit is configured to implement a segmentation algorithm to analyse the at least one image to determine the image data of the at least a part of at least one bovine animal.

In an example, the segmentation algorithm is configured to determine at least one area of the at least one image that has image data of an object other than one or more flies and wherein that object is other than the at least one bovine. Determination of the image of the at least a part of at least one bovine animal can then comprise a deselection of the at least one area from the at least one image.

In an example, the input unit is configured to provide the processing unit with at least one start image, wherein the at least one start image comprises image data of a number of bovine animals. The number of bovine animals comprises the at least one bovine animal. The first transceiver is configured to transmit the at least one start image and the second transceiver is configured to receive the at least one start image. The second transceiver is configured to provide the processing unit with the at least one start image. The processing unit is configured to select the at least one bovine animal, the selection comprising analysis of the at least one start image.

In an example, the processing unit is configured to generate at least one indication relating to the at least one bovine. The second transceiver is configured to transmit at least one indication relating to the selected at least one bovine and the first transceiver is configured to receive the at least one indication relating to the selected at least one bovine. The output unit is configured to present to a user of the device the at least one indication relating to the selected at least one bovine animal.

In an example, the output unit comprises a visual display unit. The visual display unit is configured to display the at least one start image with the at least one indication relating to the selected at least one bovine highlighted on the at least one start image.

In an example, the processing unit is configured to detect the at least one bovine animal, the detection comprising analysis of the at least one image.

In an example, analysis of the at least one image to detect the at least one bovine animal comprises utilization of an object detection algorithm.

FIG. 3 shows a method 300 for fly management, wherein step d) is optional. The method 300 comprises:

in a providing step 310, also referred to as step a), providing a processing unit with at least one image of an agricultural environment, wherein the agricultural environment contains a plurality of bovine animals; and wherein the at least one image comprises image data of at least a part of at least one bovine animal of the plurality of bovine animals;

in a determining step 320, also referred to as step b), determining by the processing unit a number of flies in the image data of the at least a part of at least one bovine animal; and in a determining step 330, also referred to as step c), determining by the processing unit information relating to fly infestation of the plurality of bovine animals, the determination comprising utilisation of the determined number of flies.

In an example, the method comprises step d), the outputting 340 by an output unit an indication relating to a treatment for fly infestation of the plurality of bovine animals based on the determined information relating to fly infestation of the plurality of bovine animals.

In an example, the at least one image was acquired by a camera of a hand-held device.

In an example, the at least one image was acquired by a camera of a smart phone.

In an example, the at least one image was acquired by a camera with a zoom lens capability.

In an example, the at least one image was acquired by a camera fixedly mounted in the agricultural environment.

In an example, the at least one image was acquired by a camera of an unmanned aerial vehicle (UAV).

In an example, the image data of at least a part of at least one bovine animal comprises image data other than image data of a bovine animal that is contiguous to the bovine animal.

In an example, the processing unit is configured to identify at least one particular type of fly in the image data of the at least a part of at least one bovine animal. The determined number of flies in the image data of the at least a part of at least one bovine animal can then be a number of flies in the image data of the at least a part of at least one bovine animal that are the at least one particular type of fly.

In an example, determination of the number of flies in the image comprises implementation of an image processing algorithm to analyse the image data of the at least a part of at least one bovine animal.

In an example, the image processing algorithm comprises a machine learning algorithm.

In an example, the machine learning algorithm is a neural network.

In an example, the neural network in a deep learning neural network comprises at least one hidden layer.

In an example, the machine learning algorithm is a trained machine learning algorithm. The machine learning training can comprise utilization of ground truth data and associated imagery.

In an example, subsequent training of the machine learning algorithm comprises utilization of the image data of the at least a part of at least one bovine animal.

In an example, the subsequent training comprises utilization of the determined number of flies.

In an example, the input unit is configured to receive from a user a validation of the indication relating to a treatment for fly infestation of the plurality of bovine animals. The subsequent training can comprise utilization of the validation.

In an example, a pixel in the image data of the at least a part of at least one bovine animal projected back to the at least part of the at least one bovine animal is less than or equal to 2 mm.

In an example, the projection of the pixel at the object plane is less than or equal to 1.5 mm.

In an example, the projection of the pixel at the object plane is less than or equal to 1.0 mm.

In an example, the projection of the pixel at the object plane is less than or equal to 0.75 mm.

In an example, the projection of the pixel at the object plane is less than or equal to 0.5 mm.

In an example, the projection of the pixel at the object plane is less than or equal to 0.25 mm.

In an example, the indication relating to the treatment for fly infestation of the plurality of bovine animals comprises an indication of a defined infestation level of a plurality of possible infestation levels.

In an example, the indication relating to the treatment for fly infestation of the plurality of bovine animals comprises a message that the plurality of bovine animals need to be treated for fly infestation.

In an example, the processing unit is configured to identify at least one chemical product useable for treatment for fly infestation. The indication relating to the treatment for fly infestation of the plurality of bovine animals can then comprise a message relating to the at least one chemical product useable for treatment for fly infestation.

In an example, the input unit is configured to enable a user to input information relating to at least one previous chemical product used for treatment of fly infestation in the agricultural environment. Identification of the at least one chemical product useable for treatment for fly infestation can comprise utilisation of the information relating to at least one previous chemical product used for treatment of fly infestation in the agricultural environment.

In an example, the indication relating to the treatment for fly infestation of the plurality of bovine animals comprises a message that the plurality of bovine animals need not be treated for fly infestation.

In an example, determination of the information relating to fly infestation of the plurality of bovine animals comprises utilization of a threshold number of flies.

In an example, the at least one image comprises a plurality of images. The at least one part of the at least one bovine animal comprises a plurality of parts of the at least one bovine animal. Each image of the plurality of images can be associated with a different part of the plurality of parts. The determined number of flies in the image data of the at least a part of at least one bovine animal can comprise a number of flies in each image of the plurality of images.

In an example, the determination of information relating to fly infestation of the plurality of bovine animals comprises a statistical analysis of the number of flies in each image of the plurality of images.

In an example, the at least one bovine animal comprises at least two bovine animals. A first part of the plurality of parts can be associated with a first bovine animal of the at least one bovine animal and a second part of the plurality of parts can be associated with a second bovine animal of the at least one bovine animal.

In an example, each part of the plurality of parts is associated with a different bovine animal.

In an example, images of two bovine animals are acquired and analysed.

In an example, images of four bovine animals are acquired and analysed.

In an example, images of eight bovine animals are acquired and analysed.

In an example, images of more than eight bovine animals are acquired and analysed.

In an example, at least one first image of the plurality of images was acquired on a different day to at least one second image of the plurality of images.

In an example, the processing unit is configured to implement a segmentation algorithm to analyse the at least one image to determine the image data of the at least a part of at least one bovine animal.

In an example, the segmentation algorithm is configured to determine at least one area of the at least one image that has image data of an object other than one or more flies and wherein that object is other than the at least one bovine. Determination of the image data of the at least a part of at least one bovine animal can comprise a deselection of the at least one area from the at least one image.

In an example, the processing unit is configured to detect the at least one bovine animal, the detection comprising analysis of the at least one image.

In an example, analysis of the at least one image to detect the at least one bovine animal comprises utilization of an object detection algorithm.

The apparatus, device, system and method for fly management are now described in more detail in conjunction with FIGS. 5-10.

Figure 5A:
FIG. 5 shows an image of fly infestation and a representative schematic of the image of fly infestation.
Figure 5B:

FIG. 5*a* is an image of a cow infested with flies and FIG. 5*b* is a representation of that image. A cow's back is shown, with flies on the cow's hide and flies flying around the cow. The skilled person will be aware of such situations, with flies infesting cattle. FIG. 5 serves to indicate the problem that the described apparatus, device, system and method address, in that fly infestation is problematic and can be at levels less than that shown, and still be economically detrimental. For example, experience has shown that 200 flies per cattle for beef cattle and 50 flies per cattle for dairy cattle are rule of thumb threshold levels, as an average level for the animals in a herd, above which a treatment should be applied to mitigate the economic impact. However, before the described apparatus, device, system and method, a farmer had no easy way to determine is such thresholds have been reached, and to do so with accuracy for a complete herd without taking undue notice of individual ones of cattle that either have a much larger number of flies than an average for the herd or conversely a much lower number of flies than the average is virtually impossible.

As described above, an apparatus, device, system and method have been developed to address this problem.

Figure 6:
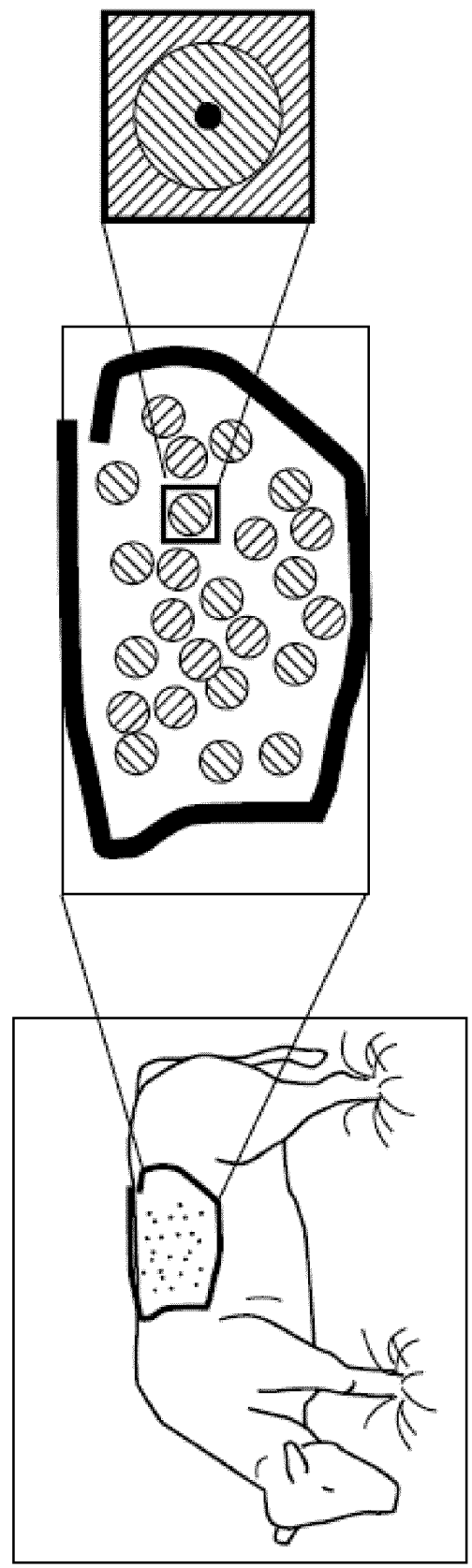
FIG. 6 shows a schematic representation of exemplar steps involved in training a machine learning algorithm used in fly management.

In a particular example, an image processing system utilizing a neural network is used to count flies, and even identify those flies on a particular cow/cattle. FIG. 6 shows steps involved in training of the neural network. It has been found that a fly on, and indeed around a cow (see FIG. 5) should be imaged at a resolution such that an image of a fly has at least 5 pixels extending in a length direction of the fly. Thus, the required image resolution at the imaged cow/steer/cattle depends upon the particular fly species prevalent at an area. For example, flies that are 1 cm in length need to be imaged at a resolution at the cow of better than or equal to 2 mm in order that at least 5 pixels extend over the length of the fly. Thus, with standard imaging systems having detectors with 2000×2000 pixels or even more, a whole cow can be imaged and indeed even more than one cow/steer and have imagery of flies at the required resolution. It is preferred to use imaging systems with detectors having larger numbers of pixels, and then have imagery at the cow with a resolution of 0.5 mm in order that all different types of flies can be imaged at the correct resolution and with the whole cow imaged as well. However, only a part of a cow need be imaged, and as discussed above a resolution of 2 mm at the cow can be used with certain fly species.

Continuing with FIG. 6, imagery of the cow is acquired, and an area of interest with flies in evidence is selected by a user. The user then identifies a series of areas in this image area, some having flies and others not having flies; and image area with a fly is indicated in FIG. 6 and others also have flies and some do not have flies. This image data for all areas is fed to the neural network along with the ground truth data as to whether there is a fly present for each of those areas. The user actually inputs the species of fly present. This process is conducted for different fly species residing on and around cows having different coloured hides, and for different breeds of cattle, at different times of day and for different lighting conditions. In addition to imagery of flies, imagery of mud spots, and other marks that could possibly be mistaken for flies is also fed into the neural network along with the ground truth information that no fly is present. Additionally, imagery with two on three flies or more in close proximity and indeed even touching is fed to the neural network, again along with ground truth information relating to the number and type of this fly species.

Figure 7A:
FIG. 7 shows an example of imagery for use in fly management and a schematic representation of the imagery for use in fly management.
Figure 7B:
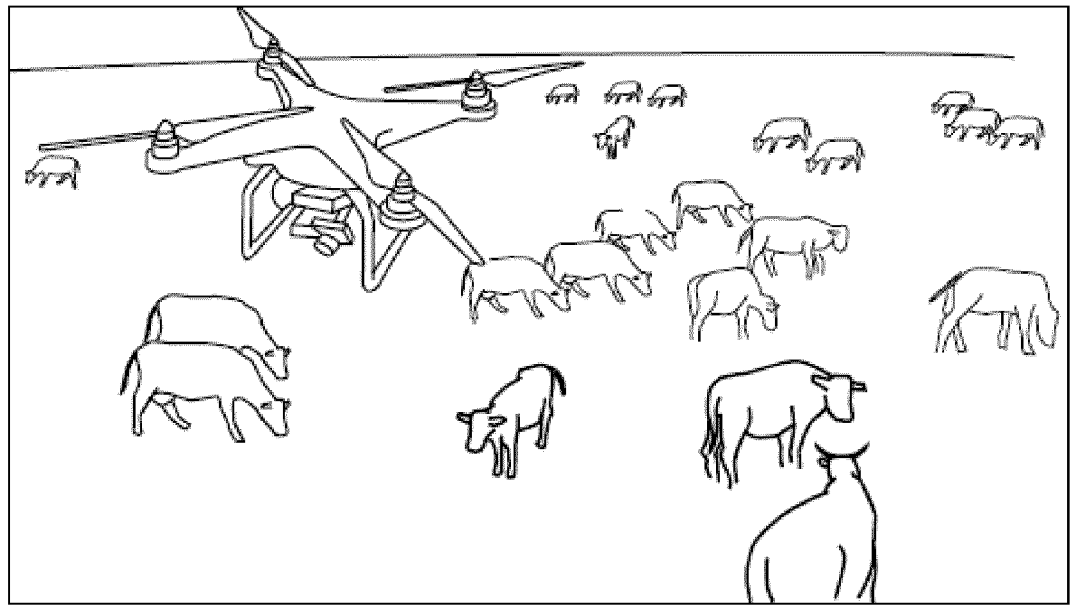

FIG. 7 then shows one example, of how the apparatus, device, system and method operate. FIG. 7a shows imagery with FIG. 7b showing a schematic representation of that imagery. A UAV is flying within a field with cattle present, and is acquiring imagery at a resolution as discussed above commensurate for fly counting analysis. The imagery can be saved or sent for analysis by an example of the described apparatus, that counts flies over a number of the cattle present in order to gain an understanding of fly infestation within the herd. Action can then be taken. The UAV can acquire imagery to be similarly analysed by a processing unit, thereby forming part of an example of the described system. The UAV can however acquire imagery and analyse the imagery itself, and be an example of the described device. Rather, than a UAV acquiring imagery it could be a handheld unit having a camera, and that unit can then acquire imagery to be processed by for an example of the apparatus, or the unit can be an example of a part of the system, or be an example of the device as described.

Figure 8:
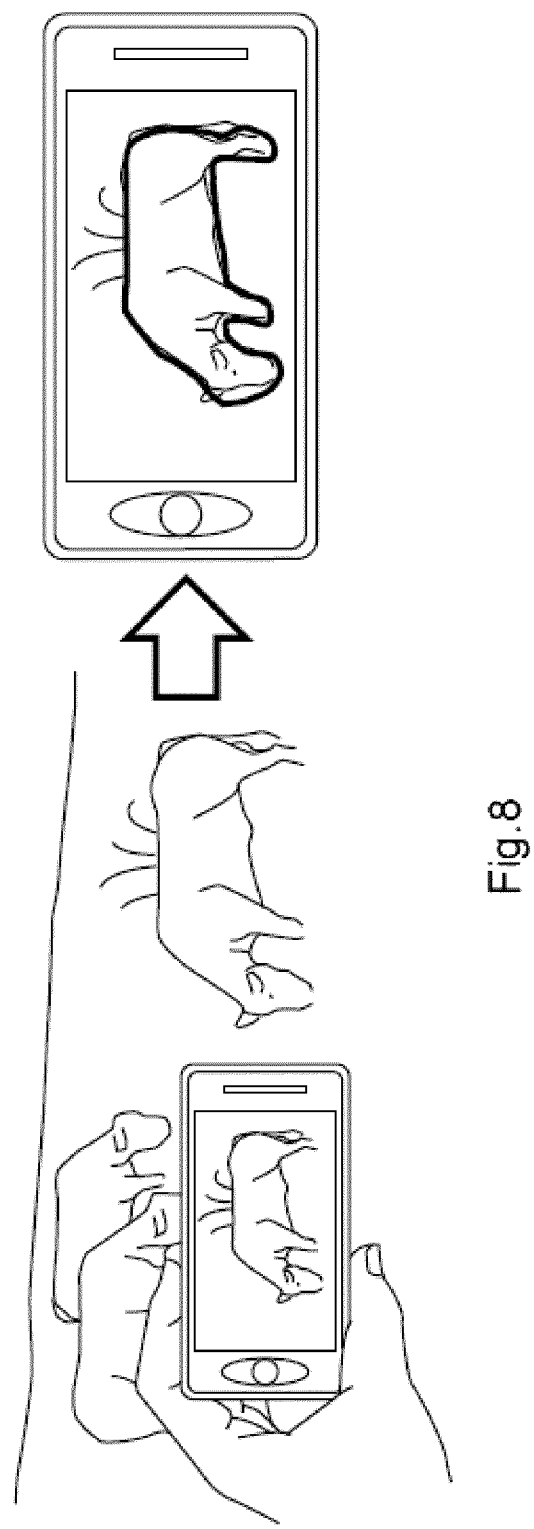
FIG. 8 shows a schematic representation of an example of the acquisition of imagery for use in fly management and a representation of an exemplar step in the utilization of that imagery.

FIG. 8 indeed shows such a handheld unit, in the form of a smart phone having a camera with sufficient resolution to acquire the prerequisite imagery. A first step, as shown in FIG. 8, is operation by a segmentation algorithm to cut out the cow from the background imagery for further processing. The cut out imagery can, if necessary, include the area around the cow in order to count flies that are in flight, as shown in FIG. 5. However, it is not necessary to count such flies in flight.

FIG. 9 shows more detail relating to the image processing. FIG. 9a shows imagery, with FIG. 9b showing schematic representations of that imagery. In the top image a farmer has acquired an image of a cow. The cow has flies on its hide, but are not clearly visible in this image. He first acquired an image of a number of cows, and superimposed on that image was an indication of the cows he should acquire imagery of in order to obtain better statistics on the fly numbers. Therefore, for example he acquired an image of 40 cattle, with 4 of those highlighted to him in order to acquire an image at a required resolution image (e.g. a close up image), with those 4 being at different positions within the herd. It doesn't particularly matter which cattle are identified, and even if the farmer takes imagery of those specific cattle or of different cattle. What the system is trying to do is ensure that the farmer does not acquire imagery of the first 4 cows he meets on the edge of the herd. And, indeed such indication of the cows to image is not required as the farmer can be informed to image random cows across the herd. However, this indication can be helpful to remind the farmer to acquire imagery across the herd.

Continuing with FIG. 9, in the second to top image the above described segmentation algorithm has cut the cow out from the background, and has removed a certain amount of "noisy" imagery, being that with plants in the foreground that cover parts of the cow. At the third image from the top, a next step of image processing has identified a part of the cow to be used to count flies. Thus, this image is shown at a higher magnification than the top two images, and the edge of the cow is outside of the frame. However, now the flies can be seen. This identification of the part of the cow can be based on a selection of a part of the cow known to attract flies such as the flank, or can be based on a first detection of what could be flies, or a mixture of both techniques. In this process step, objects have been identified that are not flies. These are the part of the top of grass in the bottom right of the frame, and a scar on the cow's hide on the left of the image. Therefore, in order to optimize the accuracy of fly counting, these objects are deselected from the imagery as shown in the bottom image in bold outline, and only the remaining part of the cow is image processed to determine the number of flies (the area bounded with a hashed line).

Figure 10A:
FIG. 10 shows an image of numbers of flies counted as part of fly management and a representative schematic of that image.
Figure 10B:
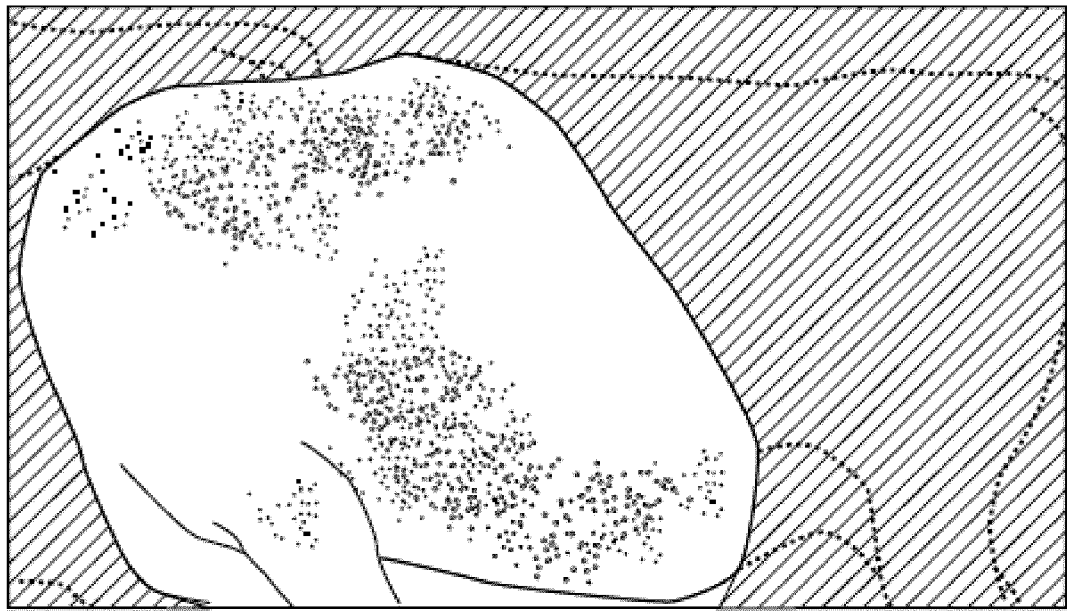

FIG. 10a shows an image of the detected flies for an appropriate part of a cow, with FIG. 10b showing a schematic representation of that image. The part of the cow having used for fly counting has been selected as discussed above. The other cows imaged by the farmer are also processed in a similar manner. An average number of flies is then calculated, and this number can be scaled if necessary to take into account the area imaged. If a threshold number of flies per cattle is reached, taking into account whether the cattle are beef or dairy cows, and taking into account the type of flies present, an indication is provided to the farmer to apply a fly treatment to the herd. Also, depending upon how far in excess of the threshold level the determined average number of flies per cattle is, the farmer is provided with an indication as to a severity of the infestation. For example, if the threshold level has just been exceeded a scale can be presented to the farmer providing this information in a simple to interpret visual manner. Such as a temperature scale at level 7—of possible indications ranging from 1-20, illuminated in amber. If, however the threshold level was grossly exceeded, then the temperature scale could be at a higher level of 19-20, illuminated in red, thereby indicating to the farmer that action is required immediately. The farmer is actually presented with a bar extending over the scale, centered at 7 but extending from 6.5 to 7.5. This provides to the farmer an indication of the accuracy of the determined infestation level. The position of the centre of the bar is determined from an average of the numbers of flies per image, and the width of the bar either side of the centre is determined from the standard deviation of the number of flies per image divided by the square root of the number of images—an error on a mean. Thus, as the farmer acquires images the visual presentation is continually being updated as imagery is acquired, with the position of the centre of the bar varying with the mean of the number of flies, and the size of the bar decreasing as the error decrease with an increasing number of images taken. Thus, the farmer also has a simple way to determine if he has acquired enough images to provide him with an accurate appreciation of the fly infestation of his herd, and can if necessary continue to acquire imagery of cattle in the field until a returned result is provided with an error margin (the size of the bar centred at the number 7 for example) that enables the farmer to determine if action is required or not. Additionally, if for example the farmer has visited the field on one or of previous occasions and acquired a determination of the infestation level, a simple time history for the farmer can be provided. Thus, the threshold level may not have been met, with an indication level of 6 in a yellow-amber colour indicated. However, 10 days earlier the indication level was 1, and five days earlier the indication level was 3. Therefore, in addition to the temperature scale of the infestation level at that time, a simple temporal graph is presented to the farmer, with days on the x-axis and infestation level on the y-axis. Thus, even though the infestation level has not actually been met on that occasion, the farmer is presented with information indicating that a problem is developing, and can decide to initiate treatment for fly infestation. These are just one way in which the farmer can be provided with an indication of the severity level, and how that is developing with time and other ways can be implemented.

Continuing with FIG. 10, on the basis of what treatment has been undertaken previously, the farmer is presented first an indication on the smart phone that treatment is required as discussed above, and this can also provide an indication of the severity of the infestation and temporal information. He is also presented with a proposed active ingredient/product to be used. The farmer can then undertake the work himself. However, in this instance he pushes a button on the phone to activate the remote treatment of the herd by a fleet of UAVs. One such UAV can be the same as that shown in FIG. 7, which has a chemical spray unit in addition to an imaging camera system. Indeed, this whole process of acquiring and analyzing imagery to determine if a fly treatment is necessary and then applying that treatment can be undertaken by the UAV with other UAVs if necessary, without the farmer's intervention being required.

It is to be noted that the above description has centred on the example of the management of fly infestation, however the provided apparatus, device, system and method can be used to enable the improved treatment for ticks and other parasites, as would be appreciated by the skilled person within the above described inventive concept.

In another exemplary embodiment, a computer program or computer program element is provided that is characterized by being configured to execute the method steps of the method according to one of the preceding embodiments, on an appropriate apparatus, device or system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus for fly management, comprising:
   an input unit;
   a processing unit; and
   an output unit;
   wherein, the input unit is configured to provide the processing unit with at least one image of an agricultural environment, wherein the agricultural environment contains a plurality of bovine animals;
   wherein, the at least one image comprises image data of at least a part of at least one bovine animal of the plurality of bovine animals;
   wherein, the processing unit is configured to determine a number of flies in the image data of the at least a part of at least one bovine animal, and wherein determination of the number of flies in the image comprises implementation of an image processing algorithm to analyse the image data of the at least a part of at least one bovine animal;
   wherein, the processing unit is configured to determine information relating to fly infestation of the plurality of bovine animals, the determination comprising utilisation of the determined number of flies; and
   wherein, the output unit is configured to output an indication relating to a treatment for fly infestation of the plurality of bovine animals based on the determined information relating to fly infestation of the plurality of bovine animals.

2. The apparatus according to claim 1, wherein the image data of at least a part of at least one bovine animal comprises image data other than image data of a bovine animal that is contiguous to the bovine animal.

3. The apparatus according to claim 1, wherein the processing unit is configured to identify at least one particular type of fly in the image data of the at least a part of at least one bovine animal, and wherein the determined number of flies in the image data of the at least a part of at least one bovine animal is a number of flies in the image data of the at least a part of at least one bovine animal that are the at least one particular type of fly.

4. The apparatus according to claim 1, wherein the image processing algorithm comprises a machine learning algorithm.

5. The apparatus according to claim 4, wherein the machine learning algorithm is a neural network.

6. The apparatus according to claim 4, wherein the machine learning algorithm is a trained machine learning algorithm, wherein the machine learning training comprises utilization of ground truth data and associated imagery.

7. The apparatus according to claim 6, wherein subsequent training of the machine learning algorithm comprises utilization of the image data of the at least a part of at least one bovine animal.

8. The apparatus according to claim 7, wherein the subsequent training comprises utilization of the determined number of flies.

9. The apparatus according to claim 7, wherein the input unit is configured to receive from a user a validation of the indication relating to a treatment for fly infestation of the plurality of bovine animals, and wherein the subsequent training comprises utilization of the validation.

10. The apparatus according to claim 1, wherein a pixel in the image data of the at least a part of at least one bovine animal projected back to the at least part of the at least one bovine animal is less than or equal to 2 mm.

11. The apparatus according to claim 1, wherein the indication relating to the treatment for fly infestation of the plurality of bovine animals comprises an indication of a defined infestation level of a plurality of possible infestation levels.

12. The apparatus according to claim 1, wherein the indication relating to the treatment for fly infestation of the plurality of bovine animals comprises a message that the plurality of bovine animals needs to be treated for fly infestation.

13. The apparatus according to claim 1, wherein the processing unit is configured to identify at least one chemical product useable for treatment for fly infestation, and wherein the indication relating to the treatment for fly infestation of the plurality of bovine animals comprises a message relating to the at least one chemical product useable for treatment for fly infestation.

14. The apparatus according to claim 13, wherein the input unit is configured to enable a user to input information relating to at least one previous chemical product used for treatment of fly infestation in the agricultural environment, and wherein identification of the at least one chemical product useable for treatment for fly infestation comprises utilisation of the information relating to at least one previous chemical product used for treatment of fly infestation in the agricultural environment.

15. The apparatus according to claim 1, wherein the indication relating to the treatment for fly infestation of the plurality of bovine animals comprises a message that the plurality of bovine animals need not be treated for fly infestation.

16. The apparatus according to claim 1, wherein determination of the information relating to fly infestation of the plurality of bovine animals comprises utilization of a threshold number of flies.

17. The apparatus according to claim 1, wherein the at least one image comprises a plurality of images, wherein the at least one part of the at least one bovine animal comprises a plurality of parts of the at least one bovine animal, and wherein each image of the plurality of images is associated with a different part of the plurality of parts, wherein the determined number of flies in the image data of the at least a part of at least one bovine animal comprises a number of flies in each image of the plurality of images.

18. The apparatus according to claim 17, wherein the determination of information relating to fly infestation of the plurality of bovine animals comprises a statistical analysis of the number of flies in each image of the plurality of images.

19. The apparatus according to claim 17, wherein the at least one bovine animal comprises at least two bovine animals, and wherein a first part of the plurality of parts is associated with a first bovine animal of the at least one bovine animal and a second part of the plurality of parts is associated with a second bovine animal of the at least one bovine animal.

20. The apparatus according to claim 17, wherein each part of the plurality of parts is associated with a different bovine animal.

21. The apparatus according to claim 17, wherein at least one first image of the plurality of images was acquired on a different day to at least one second image of the plurality of images.

22. The apparatus according to claim 1, wherein the processing unit is configured to implement a segmentation algorithm to analyse the at least one image to determine the image data of the at least a part of at least one bovine animal.

23. The apparatus according to claim 22, wherein the segmentation algorithm is configured to determine at least one area of the at least one image that has image data of an object other than one or more flies and wherein that object is other than the at least one bovine, and wherein determination of the image data of the at least a part of at least one bovine animal comprises a deselection of the at least one area from the at least one image.

24. The apparatus according to claim 1, wherein the processing unit is configured to detect the at least one bovine animal, the detection comprising analysis of the at least one image.

25. The apparatus according to claim 24, wherein analysis of the at least one image to detect the at least one bovine animal comprises utilization of an object detection algorithm.

26. A device for fly management, comprising:
a camera;
an apparatus for fly management comprising:
an input unit;
a processing unit; and
an output unit;
wherein, the input unit is configured to provide the processing unit with at least one image of an agricultural environment, wherein the agricultural environment contains a plurality of bovine animals;
wherein, the at least one image comprises image data of at least a part of at least one bovine animal of the plurality of bovine animals;
wherein, the processing unit is configured to determine a number of flies in the image data of the at least a part of at least one bovine animal, and wherein determination of the number of flies in the image comprises implementation of an image processing algorithm to analyse the image data of the at least a part of at least one bovine animal;
wherein, the processing unit is configured to determine information relating to fly infestation of the plurality of bovine animals, the determination comprising utilisation of the determined number of flies; and
wherein, the output unit is configured to output an indication relating to a treatment for fly infestation of the plurality of bovine animals based on the determined information relating to fly infestation of the plurality of bovine animals; and
a housing;
wherein, the camera and apparatus are housed within the housing; and
wherein, the camera is configured to acquire the at least one image of the agricultural environment.

27. The device according to claim 26, wherein, the input unit is configured to provide the processing unit with at least one start image, wherein the at least one start image comprises image data of a number of bovine animals, wherein the number of bovine animals comprises the at least one bovine animal, and wherein the processing unit is configured to select the at least one bovine animal, the selection comprising analysis of the at least one start image.

28. The device according to claim 27, wherein the output unit is configured to present to a user of the device at least one indication relating to the selected at least one bovine animal.

29. The device according to claim 28, wherein the output unit comprises a visual display unit, and wherein the visual display unit is configured to display the at least one start image with the at least one indication relating to the selected at least one bovine highlighted on the at least one start image.

30. The device according to claim 26, wherein the input unit is configured to enable a user to input a command instruction to apply a treatment for fly infestation to the plurality of bovine animals in response to the output of the indication relating to a treatment for fly infestation of the plurality of bovine animals on the output unit, and wherein the device is configured to transmit the command instruction to at least one fly infestation treatment application unit.

31. A system for fly management, comprising:
a camera;
a first transceiver;
a processing unit;
a second transceiver; and
a housing;
wherein, the camera, and first transceiver are housed in the housing;
wherein, the processing unit and second transceiver are not housed in the housing;
wherein, the camera is configured to acquire at least one image of an agricultural environment, wherein the agricultural environment contains a plurality of bovine animals, wherein the at least one image comprises image data of at least a part of at least one bovine animal of the plurality of bovine animals;
wherein, the first transceiver is configured to transmit the at least one image and the second transceiver is configured to receive the at least one image, and wherein the second transceiver is configured to provide the processing unit with the at least one image;
wherein, the processing unit is configured to determine a number of flies in the image data of the at least a part of at least one bovine animal, and wherein determination of the number of flies in the image comprises implementation of an image processing algorithm to analyse the image data of the at least a part of at least one bovine animal; and
wherein, the processing unit is configured to determine information relating to fly infestation of the plurality of bovine animals, the determination comprising utilisation of the determined number of flies.

32. The system according to claim 31, wherein the system comprises at least one fly infestation treatment application unit, and wherein the at least one fly infestation treatment application unit is configured to apply a treatment for fly infestation to the plurality of bovine animals on the basis of the determined information relating to fly infestation of the plurality of bovine animals.

33. The system according to claim 31, wherein the system comprises an output unit housed within the housing, and wherein the second transceiver is configured to transmit the information relating to fly infestation of the plurality of bovine animals and the first transceiver is configured to receive the information relating to fly infestation of the plurality of bovine animals; and wherein, the output unit is configured to output an indication relating to a treatment for fly infestation of the plurality of bovine animals based on the determined information relating to fly infestation of the plurality of bovine animals.

34. The system according to claim 33, wherein the system comprises an input unit housed within the housing, and wherein the input unit is configured to enable a user to input a command instruction to apply a treatment for fly infestation to the plurality of bovine animals in response to the output of the indication relating to a treatment for fly infestation of the plurality of bovine animals on the output unit, and wherein the first transceiver is configured to send the command instruction to the at least one fly infestation treatment application unit.

35. A method for fly management, comprising:

a) providing a processing unit with at least one image of an agricultural environment, wherein the agricultural environment contains a plurality of bovine animals; and wherein the at least one image comprises image data of at least a part of at least one bovine animal of the plurality of bovine animals;

b) determining by the processing unit a number of flies in the image data of the at least a part of at least one bovine animal, and wherein determination of the number of flies in the image comprises implementation of an image processing algorithm to analyse the image data of the at least a part of at least one bovine animal; and c) determining by the processing unit information relating to fly infestation of the plurality of bovine animals, the determination comprising utilisation of the determined number of flies.

* * * * *